Oct. 21, 1930.  G. C. NELSON  1,778,956
AUTOMATIC MACHINE FOR MAKING METAL PLUGS FOR BARRELS
Filed Sept. 20, 1926  7 Sheets-Sheet 1
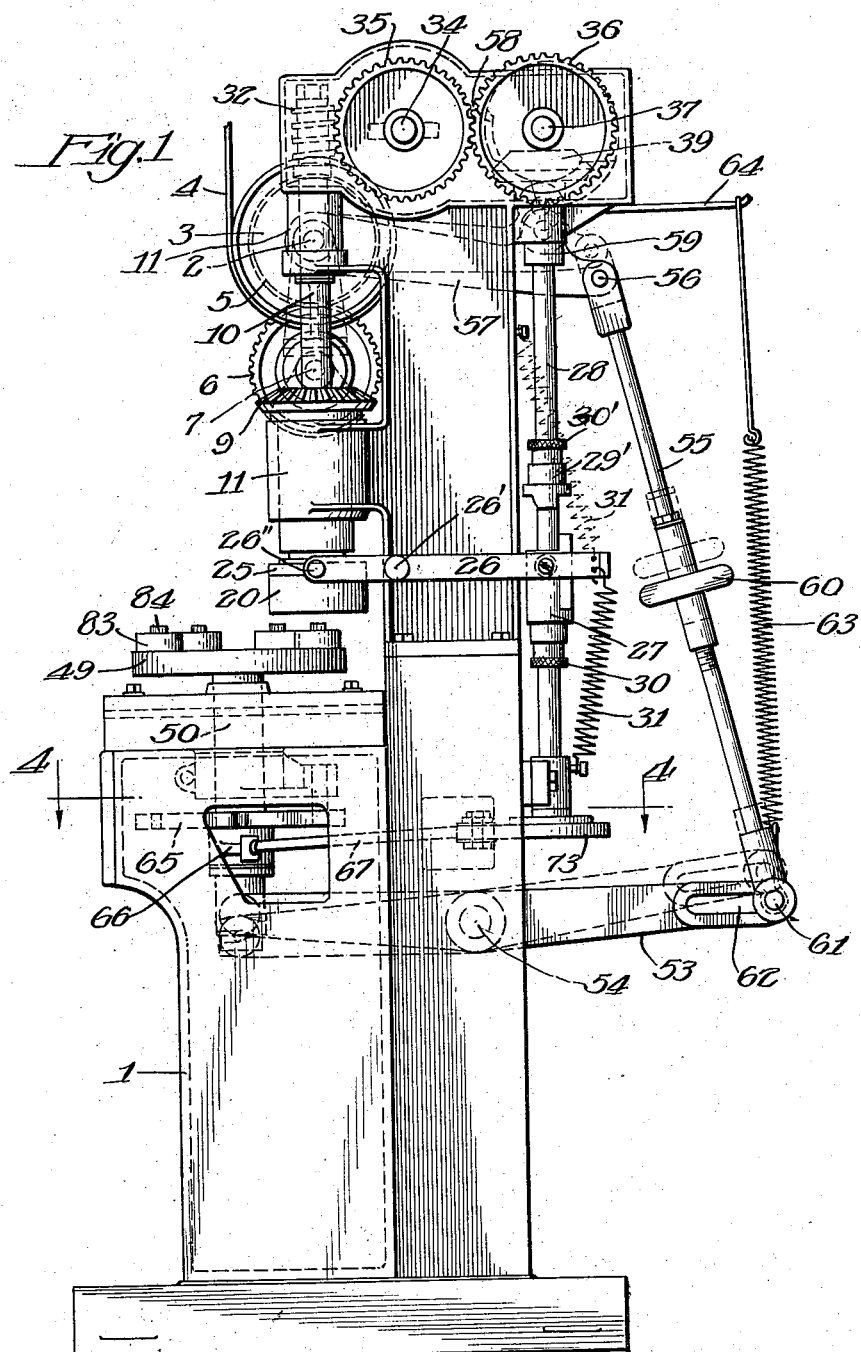

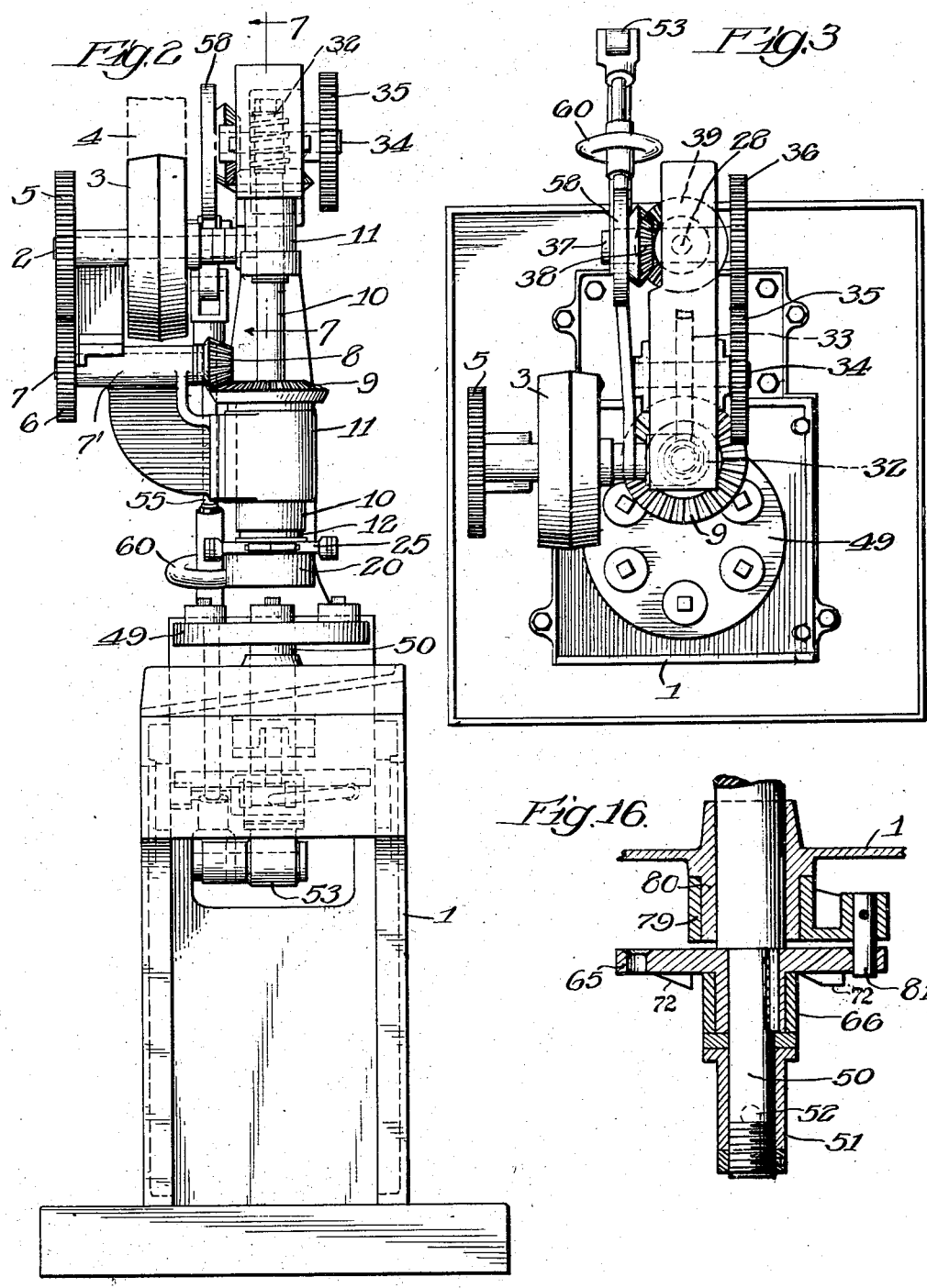

Oct. 21, 1930. G. C. NELSON 1,778,956
AUTOMATIC MACHINE FOR MAKING METAL PLUGS FOR BARRELS
Filed Sept. 20, 1926 7 Sheets-Sheet 3

Oct. 21, 1930.    G. C. NELSON    1,778,956
AUTOMATIC MACHINE FOR MAKING METAL PLUGS FOR BARRELS
Filed Sept. 20, 1926    7 Sheets-Sheet 4
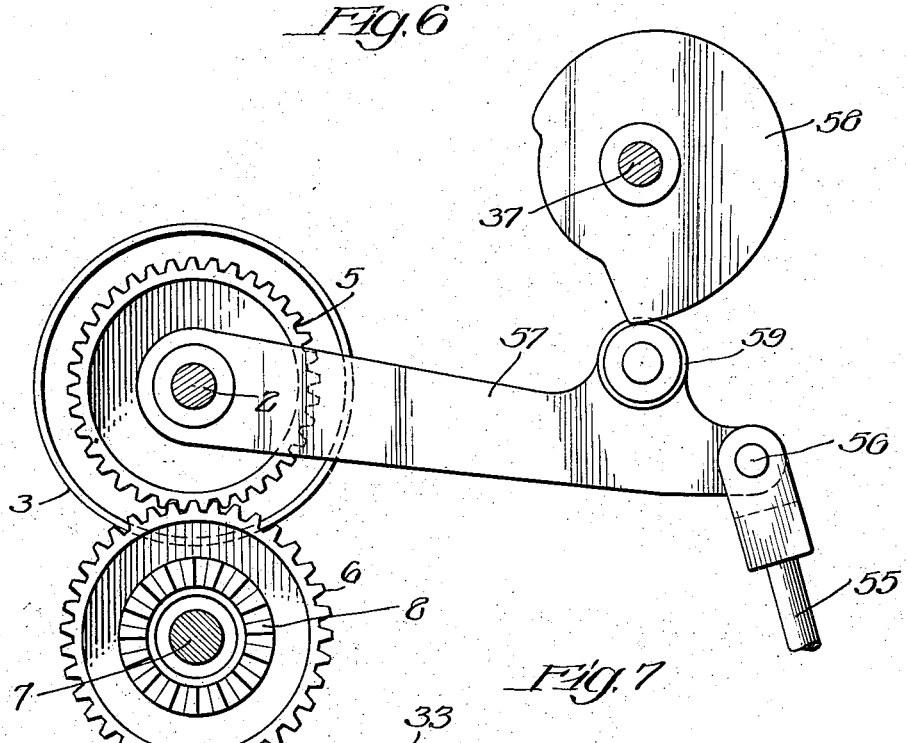
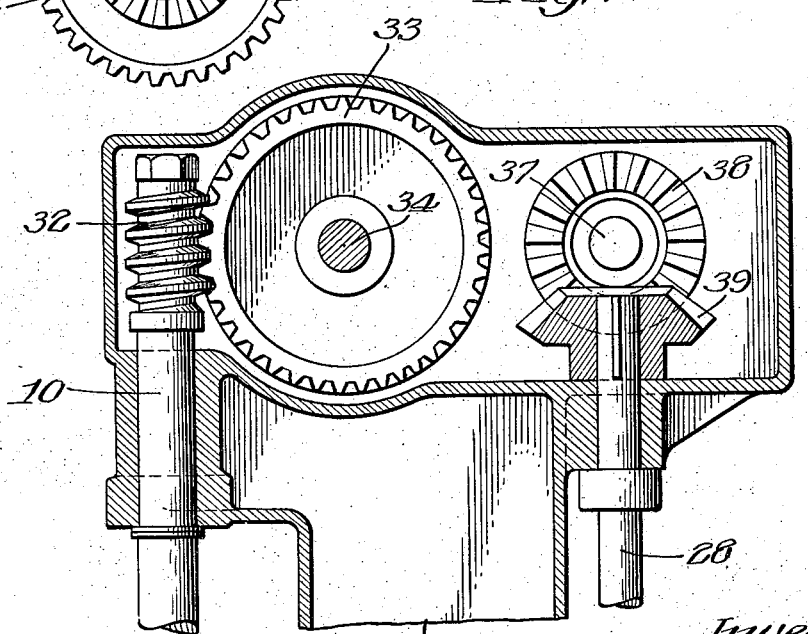

Oct. 21, 1930.   G. C. NELSON   1,778,956
AUTOMATIC MACHINE FOR MAKING METAL PLUGS FOR BARRELS
Filed Sept. 20, 1926   7 Sheets-Sheet 5
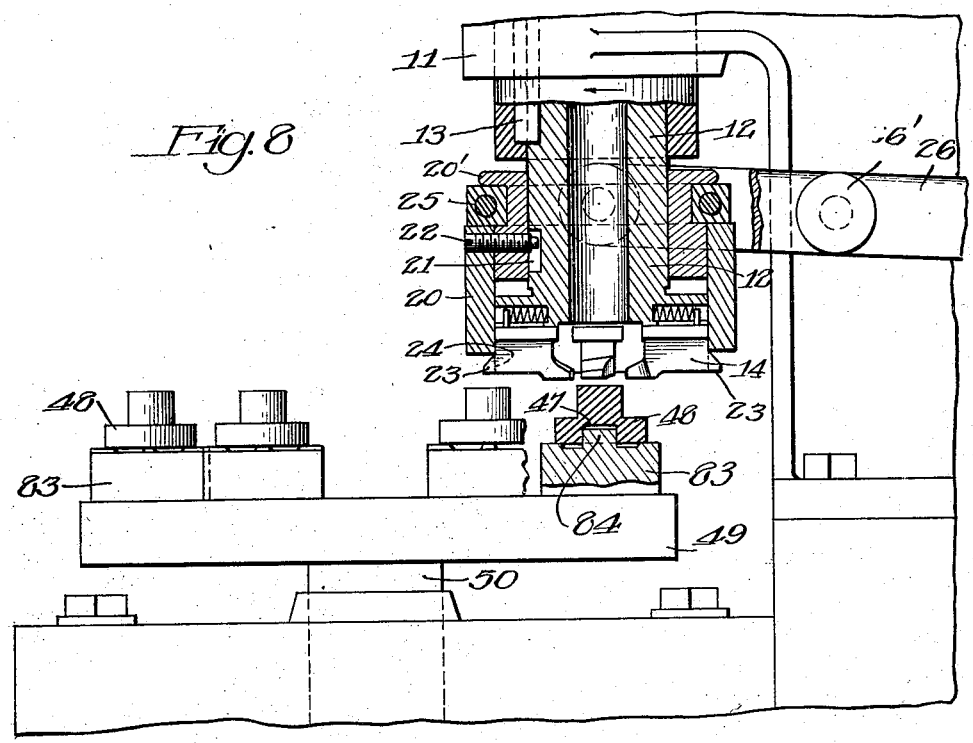

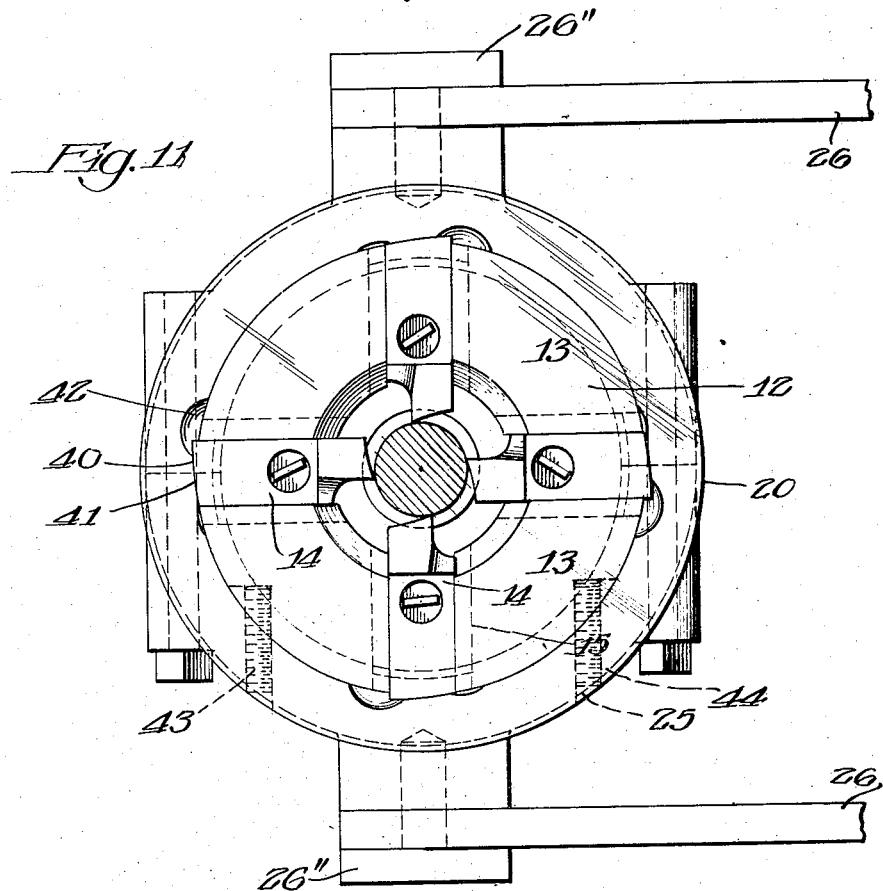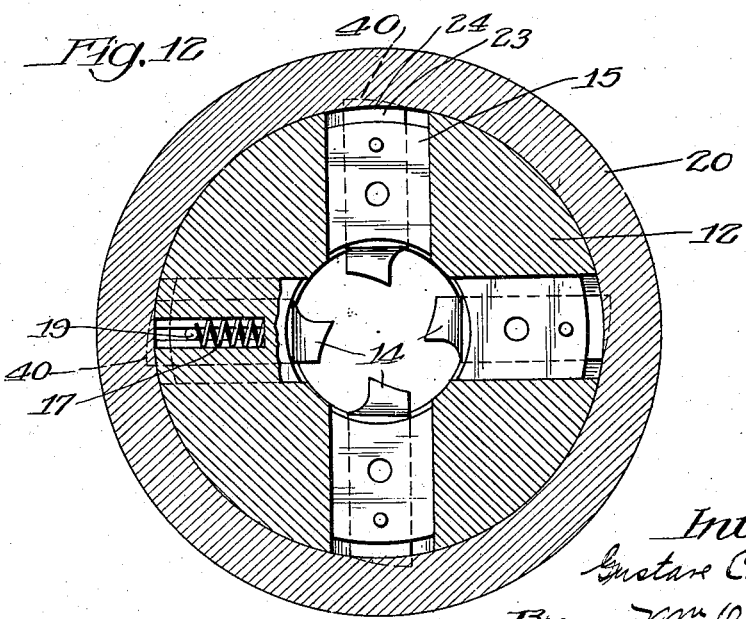

Oct. 21, 1930.  G. C. NELSON  1,778,956
AUTOMATIC MACHINE FOR MAKING METAL PLUGS FOR BARRELS
Filed Sept. 20, 1926  7 Sheets-Sheet 7
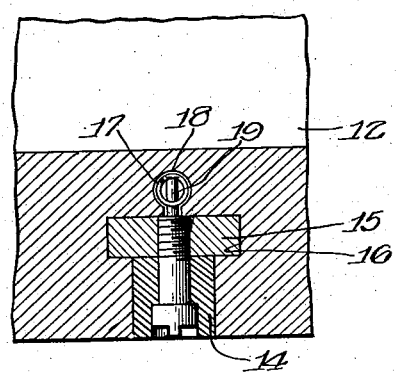
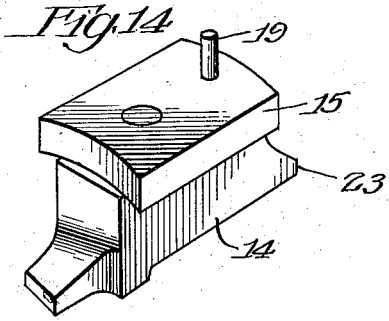
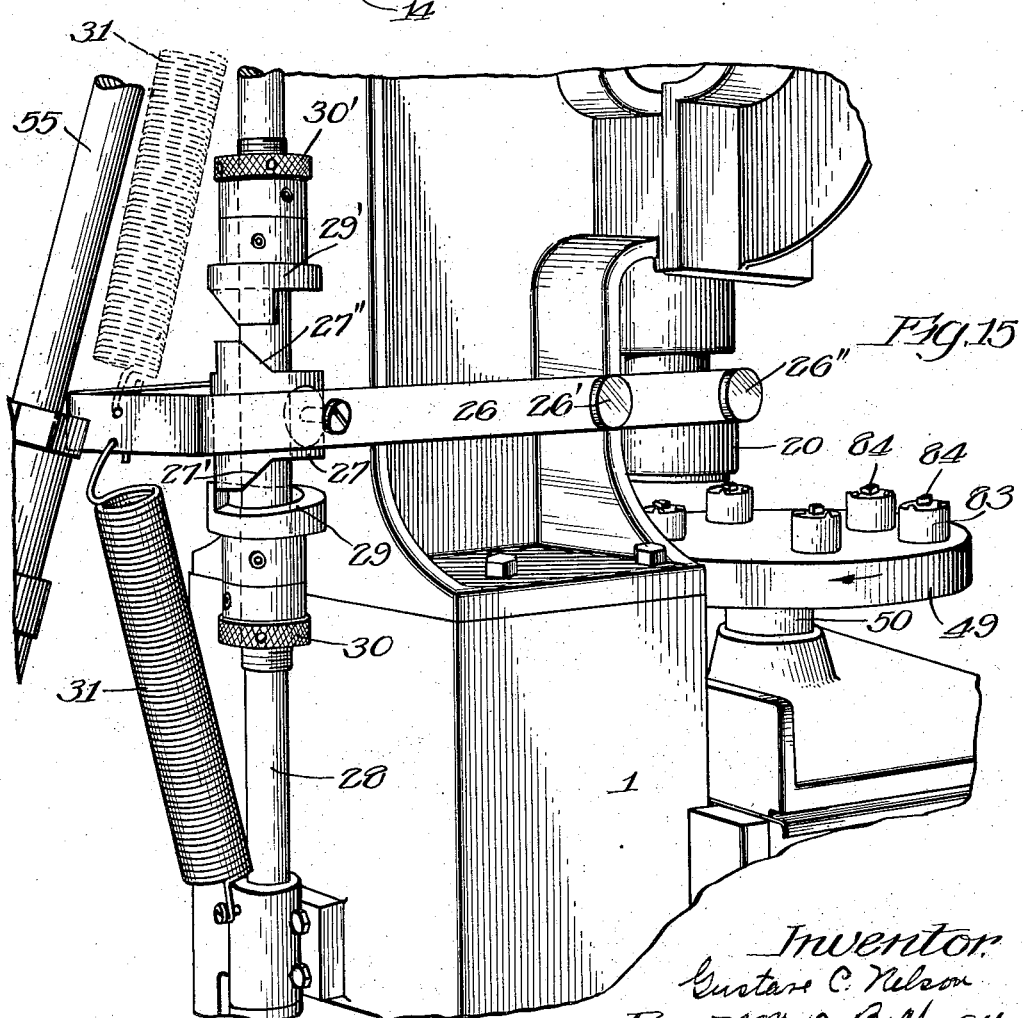

Patented Oct. 21, 1930

1,778,956

UNITED STATES PATENT OFFICE

GUSTAVE C. NELSON, OF MOLINE, ILLINOIS, ASSIGNOR TO MOLINE FOUNDRY & MACHINE COMPANY, OF MOLINE, ILLINOIS, A CORPORATION OF ILLINOIS

AUTOMATIC MACHINE FOR MAKING METAL PLUGS FOR BARRELS

Application filed September 20, 1926. Serial No. 136,457.

The object of this invention is to provide an automatic machine of comparatively simple construction for making metal plugs for barrels whereby an efficient plug of substantial construction can be produced at a relatively high rate of speed and at lower cost than has been possible heretofore.

Another object of the invention is to provide an automatic machine which can be quickly and easily changed and adapted for performing the turning, necking, and threading operations in the manufacture of metal plugs for barrels, whereby these separate operations may be performed at a higher rate of speed, and the machine may be quickly changed to perform the several operations, whereby the completed plugs may be produced more rapidly, and at a lower cost than has been possible heretofore.

And a further object of the invention is to provide a machine which is automatic in its operations and which requires only a manual feed, so that the actual labor of an operator is practically nothing more than feeding the blanks to the machine and removing them, which does not require skilled labor.

Figure 4:
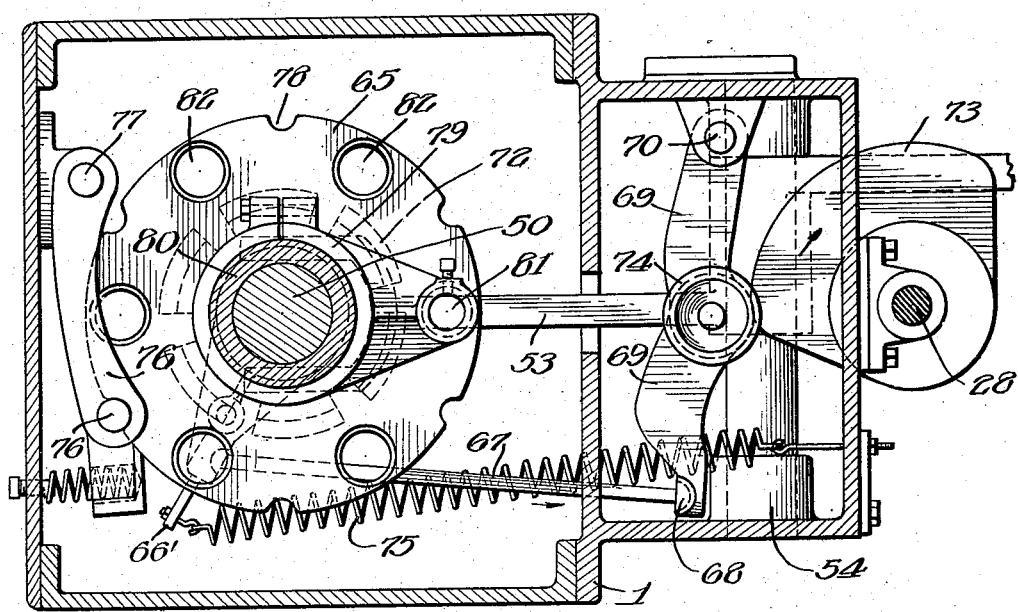
Figure 5:
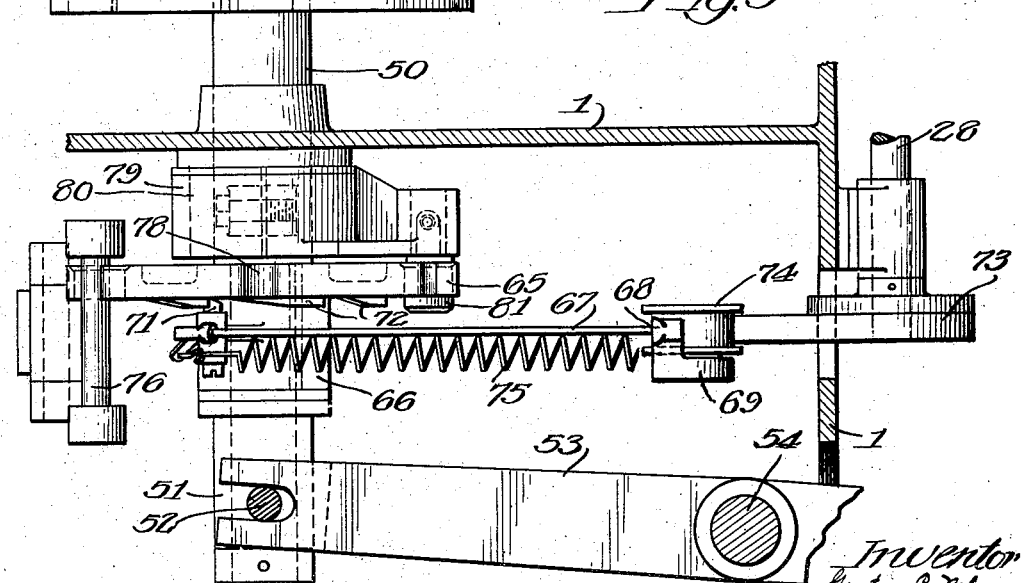

I have illustrated the machine in the accompanying drawings as equipped for necking or undercutting metal plugs for barrels, and referring thereto:

Fig. 1 is a side elevation of the machine.
Fig. 2 is a front elevation of the machine.
Fig. 3 is a top plan view of the machine.
Fig. 4 is a horizontal sectional view on the line 4—4 of Fig. 1.
Fig. 5 is an enlarged detail view, partly in section, of the index devices.
Fig. 6 is an enlarged detail view, partly in section, of the cam and some of the gears and devices for imparting a vertical movement to the work table
Fig. 7 is a detail enlarged sectional view on the line 7—7 of Fig. 2.
Fig. 8 is an enlarged view, partly in section, of the cutter head and work table showing the parts in one position.
Fig. 9 is a view similar to Fig. 8 showing the parts in operating position.
Fig. 10 is a detail view of the work after the necking operation is completed.
Fig. 11 is a horizontal sectional view on the line 11—11 of Fig. 9.
Fig. 12 is a horizontal sectional view on the line 12—12 of Fig. 9.
Fig. 13 is a detail sectional view on the line 13—13 of Fig. 11.
Fig. 14 is a detail perspective view of one of the slide blocks with the necking cutting tool thereon.
Fig. 15 is a perspective view of a part of the machine showing the means for operating the die head.
Fig. 16 is a detail view of the indexing means.

Referring to the drawings 1 designates generally the frame of the machine and 2 is the main shaft which is supported in bearings on the frame and carries a pulley 3 to which power is communicated by a belt 4 from any suitable source (Fig. 2). A gear 5 on the main shaft 2 drives a gear 6 on a shaft 7 which is supported in a bearing 7' in the frame and also carries a beveled pinion 8 which meshes with a beveled gear 9 keyed to the spindle shaft 10 which is mounted in bearings 11 in the frame and is enlarged and bored at its lower end to receive the die head 12 (Figs. 8, 9). The die head is splined to the shaft at 13 to rotate with the shaft and to slide vertically in the shaft. A plurality of cutting tools are radially mounted on the lower end of the die head, each of these tools 14 (Fig. 14) being mounted on a block 15 which slides in a slideway 16 (Fig. 13) in the die head. A spring 17 is arranged in a recess 18 in the die head above the slideway, the spring being confined between one end of the recess and a pin 19 on the slide block to move the cutting tool to retracted position. A sleeve 20 is arranged to move on the lower end of the die head, the latter having a slot 21 to receive the end of a screw bolt 22 which is mounted in the sleeve and projects into the slot to limit the sliding movement of the sleeve relative to the die head. The rear end of each cutting tool has a cam projection 23 which is beveled to form the cam 24, (Fig. 8) to be engaged by the sleeve 20. As before stated, the springs 17 retract and hold the cutting tools in retracted position, as shown in Fig.

8, at which time the sleeve 20 has been raised above the cams. When the cam sleeve is moved downward against the cams 24 and rides over these cams the cutting tools will be moved inward gradually into operative position as shown in Fig. 9. Then when the sleeve is raised again to the position shown in Fig. 8 the dies are moved to retracted position by the springs. A grooved sleeve 20' is made fast to the cam sleeve 20 by the screw bolt 22, or other suitable means and a collar 25 is engaged with the grooved sleeve in a manner similar to shift collars whereby the sleeves may revolve with the die head and move longitudinally of the die head while the collar does not revolve with the sleeves or the die head but does move with the sleeves longitudinally of the die head.

A yoke lever 26 (Figs. 1, 15) is pivoted at 26' on the frame and is connected at its front end 26" with the collar 25. A sleeve 27 is mounted in the yoke near its rear end and this sleeve slides on the cam shaft 28 which is mounted in bearings on the frame. The sleeve is provided with cams 27' and 27" on its ends to engage cams 29 and 29' adapted to be moved by adjusting collars 30 and 30' on the cam shaft into or out of operative position with the cam sleeve 27. I have shown the cam sleeve 27 arranged for operation by the lower cam 29 and a spring 31 is engaged with the rear end of the yoke lever and with a part of the frame below the yoke to hold the cam sleeve 27 in operative engagement with the cam 29 and also to raise the die cam sleeve 20. For turning and threading I would detach the lower end of the spring 31 and connect it with the frame above the yoke lever to hold the cam sleeve 27 in operative engagement with the cam 29' and for lowering the die cam sleeve 20.

A worm 32 is keyed on the spindle shaft 10, at the upper end thereof, and this worm drives a worm gear 33 on the shaft 34 which is mounted in suitable bearings in the frame and carries a gear 35 which drives a gear 36 on a shaft 37 also mounted in bearings in the frame (Figs. 1, 3). A bevel gear 38 is mounted on the shaft 37 and this bevel gear drives a bevel gear 39 on the cam shaft 28 (Figs. 1, 3, 7). Thus the cam shaft is revolved from the main shaft through the spindle shaft and suitable gearing.

To adjust the cutting dies or tools radially in the head I provide the outer end of each slide block with a cam 40 (Figs. 11 and 12) to engage a cam surface 41 on the cam sleeve 20, which cam surface terminates in the recesses 42. I also provide two adjusting screws 43 and 44 operating through the sleeve and against the die head on opposite sides of a center line drawn therethrough. The screw 43 can be operated to turn the head clockwise in the sleeve, to permit farther retraction of the cutting dies, the recesses 42 accommodating the highest part of the cam on the slide block; and the adjusting screw 44 can be operated to move the die head counter-clockwise whereby the cutting dies are adjusted farther inward. This is a simple form of micrometer adjustment which enables the cutting dies to be adjusted to a fine degree for turning, for threading, or for necking or undercutting. For necking or undercutting the tools must be moved against the work constantly during the operation and then they are opened up to clear the work, and this is accomplished by the cam 29 swinging the yoke lever 26 on its pivot to lower the sleeve 20 which engages the cam projections 23 on the rear end of the cutting dies or tools and forces them inward against the work. The slide block adjustment provides an adjustment for the cutting dies or tools so that they will always move inward to make a cut of the desired depth. In Fig. 10 I have shown a metal plug 45 having an undercut neck 46 and a square socket 47 to receive a wrench.

The blanks 48 (Figs. 1, 8, 9) for necking are carried on a work table 49 which is supported on a shaft 50, said shaft carrying a sleeve 51 at its lower end having studs 52 thereon with which the forked end of a lever 53 is engaged (Figs. 1–53). This lever is pivoted at 54 on the frame and it is adapted to raise and lower the work table to bring a blank into operative position to receive the cutting dies. A rod 55 is connected to the rear end of the lever 53 and to the end 56 of a cam lever 57 which is pivoted on the main shaft 2 (Fig. 6). A cam 58 on the shaft 37 engages a roller 59 on the cam lever 57 and operates said lever to operate the lever 53 and raise and lower the work table. The rod 55 is provided with an adjusting device 60 (Fig. 1) and the lower end of this rod has a pivot pin 61 which engages a slot 62 in the rear end of the lever 53 so that adjustments may readily be made for changing the limit of movement of the work table as the work requires. A spring 63 is attached to the rear end of the lever 53 and to a fixed part 64 on the frame to hold the cam lever 57 in engagement with its cam and to swing the lever 53 for lowering the work table.

Provision is made for revolving the work table intermittently, the operator keeping it supplied with blanks and taking the finished work therefrom. To accomplish this intermittent motion, which indexes the work, I provided what amounts, in effect, to a ratchet feed with a detent to prevent over-run of the index plate, and a positive lock for the plate. Referring particularly to Figs. 1, 4, 5 and 16, an index plate 65 is rigidly mounted on the work table shaft 50 and a sleeve 66 is movably mounted on the hub extending below the index plate. A push rod 67 has a ball and socket engagement at one end 68 with a cam lever 69 which is pivoted at 70 in the frame. The other end of the rod 67 is connected to an arm 66' on the sleeve 66 which carries a spring pressed pawl 71 arranged to engage ratchet teeth 72 on the under side of the index plate. A cam 73 is mounted on the cam shaft 28 and engages a roller 74 to operate the cam lever 69 for advancing the push rod 67 and revolving the index plate a part turn. A spring 75 is attached at one end to the arm 70 and at its other end to a frame for holding the push rod in engagement with the cam lever and for retracting the sleeve 66 so that the spring pressed pawl will engage another tooth on the index plate. The spring pawl rides over the teeth on the index plate in the retracting movements of the rod and sleeve. A spring pressed detent 76 is pivoted at 77 on the frame and is arranged to engage notches 78 in the edge of the index plate to stop the plate at the end of each intermittent movement, and this detent is elongated to engage the index plate throughout the vertical movement of said plate with the shaft and the work table. A collar 79 is clamped on a boss 80 on the frame, and this collar carries a pin 81 which is arranged to enter the holes 82 in the index plate for locking the index plate in fixed position during the operation of the cutting dies. This locking device is always in fixed position to engage an opening in the index plate where the latter is carried up by the shaft as the work table carries the work into position for the cutting dies. The work table is provided with supports 83 having squared projections 84 to engage the sockets 47 in the blanks 48.

My invention provides an automatic machine of comparatively simple construction for making metal plugs for barrels. The machine can be used for turning and threading the plugs and for necking or undercutting them. It will be necessary to employ different cutting dies for the several operations and to change the cams or the gearing as may be required, but in all essential respects the automatic operation of the machine will remain the same. I have shown and described the invention as equipped for making metal plugs for barrels, and these plugs may be made in various shapes and sizes, and other similar devices may be made in the machine when equipped with suitable dies and other timing parts. Changes in the form, construction and arrangement of parts may be made without departing from the invention and I reserve the right to make all such changes as fairly fall within the scope of the following claims.

I claim:

1. In an automatic machine of the class described, a frame, a die head supported by said frame, radially disposed dies carried by the head, springs normally urging the dies radially outwardly, means for rotating the die head, an axially movable cam sleeve surrounding said dies and engaging the ends thereof for moving the dies inwardly to the work, means for moving said cam sleeve axially, said sleeve and dies having cam surfaces thereon operable when said die head and sleeve are rotated relatively to adjust the dies radially, and means for preventing relative rotation between the die head and the sleeve.

2. In an automatic machine of the class described, a frame, a die head supported by said frame, radially disposed dies carried by the head, springs normally urging the dies radially outwardly, means for rotating the die head, an axially movable cam sleeve surrounding said dies and engaging the ends thereof for moving the dies inwardly to the work, means for moving said cam sleeve axially, said sleeve and dies having cam surfaces operable when the die head and sleeve are rotated relatively to adjust the dies radially, and means for relatively rotating the die head and sleeve.

3. In an automatic machine of the class described, a frame, a die head supported by said frame, a plurality of radially movable dies carried by the head, a cam sleeve movable axially by said rotating means to engage all of said dies for moving the dies radially to the work, and spring means arranged in the head and engaging each die for moving the dies outwardly away from the work upon disengagement of said sleeve from the dies.

4. In an automatic machine of the class described, a frame, a die head supported by said frame, a plurality of radially movable dies carried by the head and having cam surfaces at their outer ends, means for rotating the die head, an axially slidable sleeve surrounding the die head and engaging the cam surfaces of the dies for simultaneously moving all of the dies to the work, said sleeve and dies having cam surfaces operable when the die head and sleeve are rotated relatively to adjust the dies radially, and means for relatively rotating the die head and the sleeve.

5. In an automatic machine of the class described, a frame, a die head carried by said frame, means for rotating the die head, a plurality of radially disposed dies carried by the head and having cams at their outer ends, a reciprocable sleeve surrounding the die head and engaging said cams for moving the die to the work and means actuated by the relative rotation of the die head and sleeve for radially adjusting the dies.

6. In an automatic machine of the class described, a frame, a die head supported by said frame, means for rotating the die head, a plurality of dies carried by the head and disposed radially thereto, each die having a cam at its outer end, a sleeve on the head surrounding the dies and slidable to engage said cams for moving all the dies to the work simultaneously, means operated by said rotating means for sliding said sleeve intermittently into and out of engagement with said cams, spring means for retracting the dies from the work when the sleeve is disengaged from the cams, said sleeve and dies having cam surfaces operable when the die head and sleeve are rotated relatively to adjust the dies radially, means for relatively rotating the die head and the sleeve, a revolving work table carrying the work, and means operated by said rotating means to revolve the work table intermittently, and means for shifting the work table towards and from the dies.

7. In an automatic machine of the class described, a frame, a die head supported by said frame, means for rotating the die head, said head having radial slideways therein, a plurality of dies, a block on each die slidable in said slideways, a cam on the outer end of each die, a sleeve surrounding said dies and slidable on the head to engage said cams for moving the dies to the work, means operated by said rotating means for sliding said sleeve into and out of engagement with said cams, a spring connected to each block for retracting the dies when the sleeve is disengaged from the cams, said sleeve and dies having cam surfaces operable when the die head and sleeve are rotated relatively to adjust the dies radially, and means for relatively rotating the die head and sleeve.

8. In an automatic machine of the class described, the combination of a frame, a spindle shaft, means for rotating said shaft, a die head carried by said shaft, a die carried by said head, a work table, a cam shaft mounted on the frame, means for rotating said cam shaft by said spindle shaft, means operated by said cam shaft for revolving said work table intermittently, means operated by said spindle shaft for moving the work table toward and from the die head to carry the work to and from the die, means for stopping the work table during intermittent rotation thereof, and means independent of said last named means for positively locking the table in fixed position during operation of the die.

9. In an automatic machine of the class described, the combination of a frame, a spindle shaft mounted in the frame, a die head carried by said shaft, a die carried by the head, means for rotating the spindle shaft, a work table, means operated by said spindle shaft for revolving the work table intermittently, means operated by the said spindle shaft for moving the work table toward and from the die head to carry the work to and from the die, means for stopping the table during intermittent rotation thereof, and means for positively locking the work table in fixed position during the operation of the die on the work.

10. In an automatic machine of the class described, the combination of a frame, a spindle shaft mounted in the frame, a die head carried by said shaft, a die radially mounted in head, means for rotating the spindle shaft, a work table, an index plate rigid with the work table, ratchet means for revolubly moving said index plate and work table, means operated by said spindle shaft to move the work table to and from the die head to carry the work to and from the die, means engaging the index plate for stopping said plate and the work table intermittently and means passing through the index plate for positively locking the index plate and the work table in fixed position during the operation of the die on the work.

11. In an automatic machine of the class described, the combination of a frame, a spindle shaft mounted in the frame, a die head carried by said shaft, a plurality of dies carried by the head, means for rotating the spindle shaft, a work table, an index plate rigid with the work table, means operated by said spindle shaft for revolubly moving said index plate and work table intermittently, said work table having recesses in its periphery, a spring pressed detent to engage said recesses, means for moving the dies to the work, means operated by said spindle shaft to move the work table to and from the die head to carry the work to and from the dies, and means for locking the index plate and the work table in fixed position during the operation of the dies on the work.

12. In an automatic machine of the class described, the combination of a frame, a spindle shaft mounted in the frame, a die head carried by said shaft, a plurality of tools radially mounted in the head, means for simultaneously moving the dies to the work, means for rotating the spindle shaft, a work table, an index plate rigid with the work table, said index plate and work table being slidable relative to the die head and said index plate having recesses in its periphery, ratchet means for revolving the index plate and work table intermittently, an elongated detent for engaging the recesses in the index plate, means operated by said spindle shaft for operating said ratchet means, means operated by said spindle shaft to move the work table to and from the die head to carry the work to and from the tools, and locking means extending through the index plate for holding said plate and the work table in fixed position during the operation of the tools on the work.

13. In an automatic machine of the class described, the combination of a frame, a spindle shaft mounted in the frame, a die head carried by said shaft, a plurality of tools slidable in the head, means for rotating the spindle shaft, slidable means operated by the rotating means for simultaneously moving the dies to the work, a work table, an index plate rigid with the work table, means operated by said spindle shaft for revolubly moving said index plate and work table intermittently, means operated by said spindle shaft to move the work table to and from the die head to carry the work to and from the tools, means engaging the periphery of said plate for holding the plate intermittently, said index plate having a plurality of openings therein, and a pin mounted rigidly on the frame to engage one of the openings in the index plate while the work table supports the work in operative position relative to the tools.

GUSTAVE C. NELSON.